United States Patent [19]
Loosen et al.

[11] Patent Number: 5,209,567
[45] Date of Patent: May 11, 1993

[54] APPARATUS FOR MEASURING THE RADIATION CAPACITY OF LASERS

[75] Inventors: Peter Loosen, Aachen; Volker Sturm, Würselen; Alexander Drenker, Aachen, all of Fed. Rep. of Germany

[73] Assignee: Fraunhofer Gesellschaft zur Forderung der angewandten Forschung e.V., Fed. Rep. of Germany

[21] Appl. No.: 623,929

[22] PCT Filed: Jun. 16, 1989

[86] PCT No.: PCT/DE89/00402
§ 371 Date: Feb. 12, 1991
§ 102(e) Date: Feb. 12, 1991

[87] PCT Pub. No.: WO89/12806
PCT Pub. Date: Dec. 28, 1989

[30] Foreign Application Priority Data

Jun. 17, 1988 [DE] Fed. Rep. of Germany ....... 3820619

[51] Int. Cl.[5] .......................................... G01K 17/00
[52] U.S. Cl. .................................. 374/32; 250/338.1
[58] Field of Search .............. 374/32, 120, 121, 127, 374/128, 179; 250/338.1, 340, 338.3, 349; 356/43

[56] References Cited

U.S. PATENT DOCUMENTS

| | | | |
|---|---|---|---|
| 3,561,265 | 2/1971 | Schmidt | 374/32 |
| 3,783,685 | 1/1974 | Zeiders, Jr. et al. | 374/32 |
| 3,908,457 | 9/1975 | Drong et al. | 374/32 |
| 4,501,967 | 2/1985 | Shaulov | 250/338.3 |
| 4,865,446 | 9/1989 | Inoue et al. | 374/32 |
| 4,964,735 | 10/1990 | Sasnett et al. | 374/32 |

FOREIGN PATENT DOCUMENTS

| | | |
|---|---|---|
| 3002558 | 4/1981 | Fed. Rep. of Germany . |
| 57-104828 | 6/1982 | Japan . |
| 59-73739 | 4/1984 | Japan . |
| 2107862 | 5/1983 | United Kingdom . |

OTHER PUBLICATIONS

The Review of Scientific Instruments, vol. 42, No. 1, Jan. 1971. Lachambre: "A Pyroelectric Energy Meter," pp. 74–77.

Journal of Physics E: Scientific Instruments, vol. 6, No. 2, Feb. 1973. Gunn: "Calorimetric measurements of laser energy and power,", pp. 105–109.

Sensors and Actuators, vol. 5, No. 3, May, 1984. Shaulvov: "Broad Band Infrared Thermal Detector" pp. 207–215.

Electronic Engineering, vol. 59, No. 730, Oct. 1987. Foord et al.: "Preamp For a Pyroelectric Detector," pp. 32, 36.

Primary Examiner—William A. Cuchlinski, Jr.
Assistant Examiner—G. Bradley Bennett
Attorney, Agent, or Firm—Evenson, McKeown, Edwards & Lenahan

[57] ABSTRACT

Apparatus for measuring the radiation power of lasers, particularly infrared lasers, with a thermal detector, which supplies a power-caused measurement signal.

In order to be able to measure rapid laser radiation power changes, the apparatus is so constructed that there is a device which locally integrates the laser radiation and to which, apart from the thermal detector, is connected at least one further detector, which is able to detect radiation power changes with a larger band width than the band width detectable by the thermal detector and that there is a circuit combining the measurement signals of the detectors.

20 Claims, 3 Drawing Sheets

APPARATUS FOR MEASURING THE RADIATION CAPACITY OF LASERS

DESCRIPTION

1. Technical Field

The invention relates to an apparatus for measuring the radiation power of lasers, particularly infrared lasers, with a thermal detector emitting a power-caused measurement signal.

2. Prior Art

The precise knowledge of the time dependence of the power of a laser beam over a maximum wide frequency range or a large band width of the power changes is important for numerous machining processes. It is known to couple out a few permille of the radiation power in the resonator by an end mirror or reflector and to measure same with a water-cooled beam trap, which essentially comprises a laser radiation-absorbing, cooled, black casing, to which thermocouples are fitted in such a way that they supply a voltage proportional to the power of the incident laser radiation. Said voltage can be used via an amplifier for indicating the power. However, the known apparatus has a relatively high thermal capacity. Therefore the voltage supplied can only very slowly follow time changes in the radiation power. The time constant is more than 10 seconds. The known apparatus is consequently unsuitable for the measurement of rapid power changes.

DESCRIPTION OF THE INVENTION

The problem of the present invention is to so improve an apparatus of the aforementioned type, that it is suitable for measuring both the time average and also rapid power changes of laser radiation and in particular for infrared lasers, such as carbon dioxide lasers.

This problem is solved in that a device is provided which locally intergrates the laser radiation and to which is connected, apart from the thermal detector, at least one further detector making it possible to detect radiation power changes with a larger band width than that detectable by the thermal detector, and in that there is a circuit combining the measurement signals of the detectors.

In order to be able to detect power changes n a wide frequency range, it is important according to the invention to use detectors having different band widths for the radiation power changes to be detected. However, in the case of several detectors it must be ensured that they are proportionately identically irradiated. This is not very easy to achieve, because over the beam cross-section, the laser radiation has inhomogeneous intensity distributions. However, it is achieved in the case of the device provided according to the invention, which locally integrates the laser radiation and which influences the latter.

In order to bring about the local homogenization of the laser-radiation, the apparatus is constructed in such a way that the device locally integrating the laser radiation has an optics focussing the laser radiation into a small window of a hollow sphere and that the detectors are located in an area of the sphere interior which is only irradiated by reflected radiation, or the integrating device essentially comprises diffusing screen. The laser radiation focussed in the hollow sphere undergoes a multiple diffuse reflection, so that all the surface elements of the inner face of the sphere, to the extent that they are not directly subject to the effect of the laser radiation, are irradiated with the same intensity. Thus, the detectors are uniformly loaded with respect to one another, so that the measurement signals emitted by them are also in a corresponding constant relationship to one another. The further possibility of constructing a local integrating device as a diffusing screen has the advantage of greater constructional simplicity, but suffers from increased absorption losses when the radiation passes through the diffusing screen, which is in particular disadvantageous for those detectors, which require a comparatively high measuring power in order to be able to produce an evaluatable measurement signal.

Advantageously the thermal detector is a thermopile comprising a plurality of thermocouples and the further detector is a pyroelectric detector and, if necessary, a high or low-pass filter is provided. The thermocolumn comprises a series connection of miniaturized thermocouples, in which hot or irradiated contact points of the detector alternate with cold contact points at the casing temperature level. An output voltage is produced, which is proportional to the temperature difference between the detector surface and the casing. The active detector surface has a comparatively low thermal capacity, so that the voltage signal at the thermopile output can react comparatively rapidly to a change in the power of the incident infrared radiation. The frequency response is e.g. 0 to 20 Hz. The pyroelectric detector has a crystal which, in the case of temperature changes, has opposite charges at its contact faces. The resulting measurement signal is a measure of the radiation power producing the latter. The pyroelectric detector reacts very rapidly to radiation intensity changes, so that it has a correspondingly large band width. The frequency response is e.g. 10 Hz to 300 kHz. Therefore the two detectors cover different frequency ranges and the combining circuit produces an output signal, which e.g. detects the power change range of 0 to 300 kHz.

Advantageously, the thermal detector and the pyroelectric detector are constructed with the sam time constants, or in the case of detectors with non-identical time constants, there are timing elements matching them to one another. In both cases the detectors have the same time behaviour, so that in principle a simple addition of the measurement signals by the combining circuit is sufficient to obtain an output signal representative of all the detected power changes.

For the case that the detectors react in time-differing manner to the radiation changes, the circuit combining the detector measurement signals has an equalizing circuit or equalizer correcting the different response behaviours of the detectors. For this purpose the apparatus is appropriately constructed in such way that the equalizer has an output signal-supplying adder and to whose one input is connected a proportional branch supplying the measurement signal of the pyroelectric detector and to whose other input is connected a circuit integrating the measurement signals of both detectors.

The combining circuit conventionally comprises components, e.g. semiconductor components, whose voltages drift for thermal reasons. This leads to defective output signals as a result of the integrating behaviour of the circuit combining the measured signals of the detectors. This is e.g. also accompanied by interfering or disturbing influences as a result of the unavoidable, thermally caused noise of the pyroelectric detector. In order to avoid such undesirable influencing of the output signal, the combining circuit is provided with a circuit which feeds back its output signal. The feedback circuit has an inverting operational amplifier and a proportional-integral controller supplying its output signal and the measurement signal of the thermal detector to the input of the integrating circuit of the equalizer. Thus, there is a comparison between said output circuit and the measurement signal of the thermal detector across a PI-controller which returns to the equalizer input the difference resulting from the interference, so that the latter cannot have a falsifying effect on the output signal.

BRIEF DESCRIPTION OF THE DRAWINGS

The invention is described in greater detail hereinafter relative to an embodiment and the attached drawings, wherein show.

BEST WAY FOR PERFORMING THE INVENTION

Figure 1:
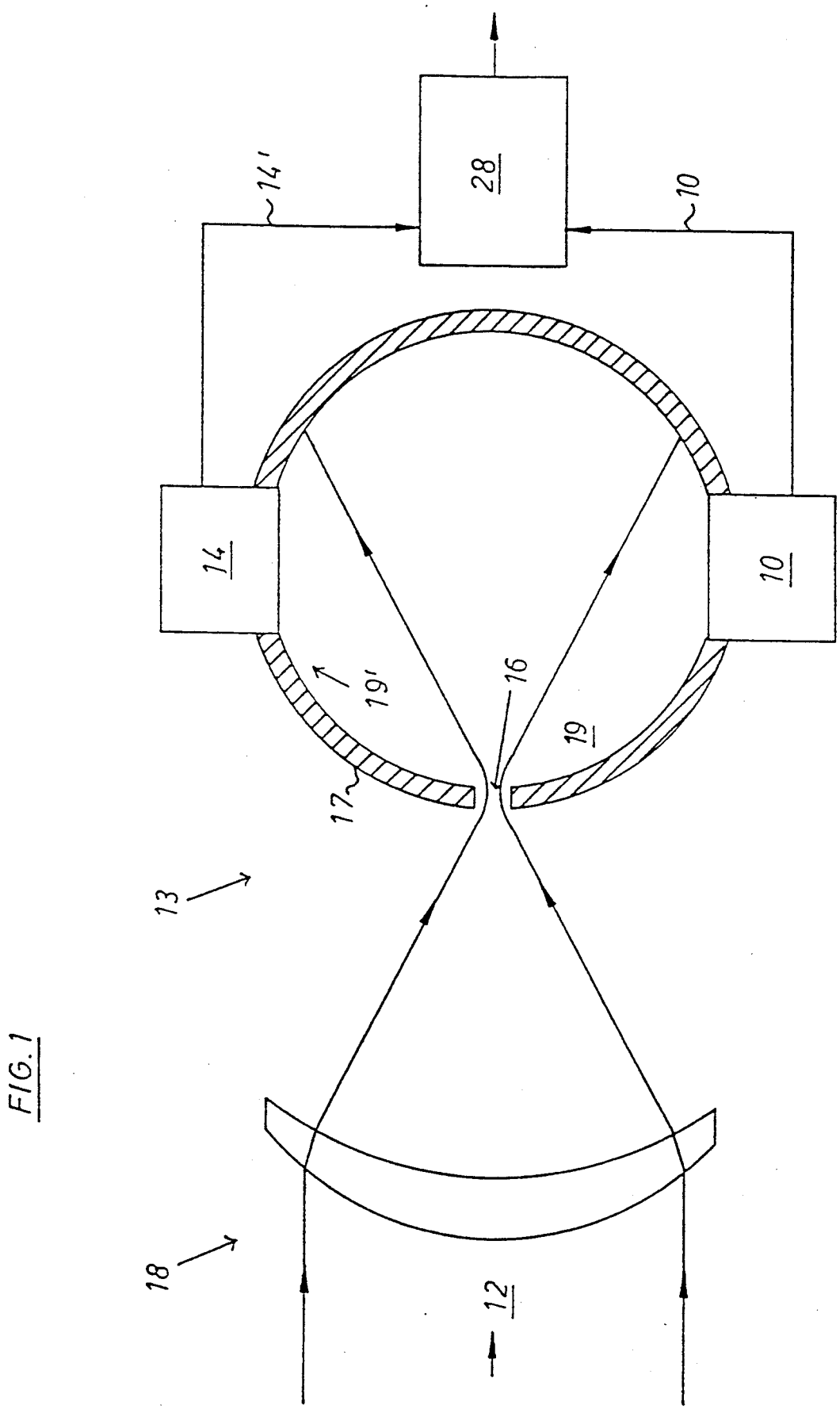
FIG. 1 A device locally integrating the laser power.

FIG. 1 shows laser radiation 12, e.g. coupled out by a partly transmissive end mirror of a laser resonator and whose power is proportional to the total power of the laser radiation coupled out. The radiation 12 has the same local, mode-caused intensity distribution. The laser radiation 12 reaches a focussing optics 18, whose focus is in the vicinity of a small window 16 of a hollow sphere 17. Therefore the laser radiation 12 is focussed into the interior 19 of the hollow sphere 17, where it undergoes multiple reflectons. The hollow sphere 17 corresponds to an integrating sphere, which is used as sphere photometer. Within the hollow sphere 17 the laser radiation undergoes multiple reflection in different directions, based on the individual beam cross-section proportions, so that there is an integrating action in the sense of rendering uniform the intensity distribution of the radiation. This ensured that the time dependence of the incident infrared radiation on the inner wall of the hollow sphere is identical and is proportional to the laser beam power.

To the hollow sphere 17 detectors 10, 14 are connected in such a way that their detector faces are located exclusively in areas 19' of the sphere interior 19 irradiated by the reflected radiation. The output signals of these detectors 10, 14 are supplied across corresponding output lines 10', 14' to a circuit 28, which combines measurement signals 11, 15, cf. FIG. 4, of the detectors 10, 14 and makes available an output signal, which is proportional to the radiation changes.

Figure 2:
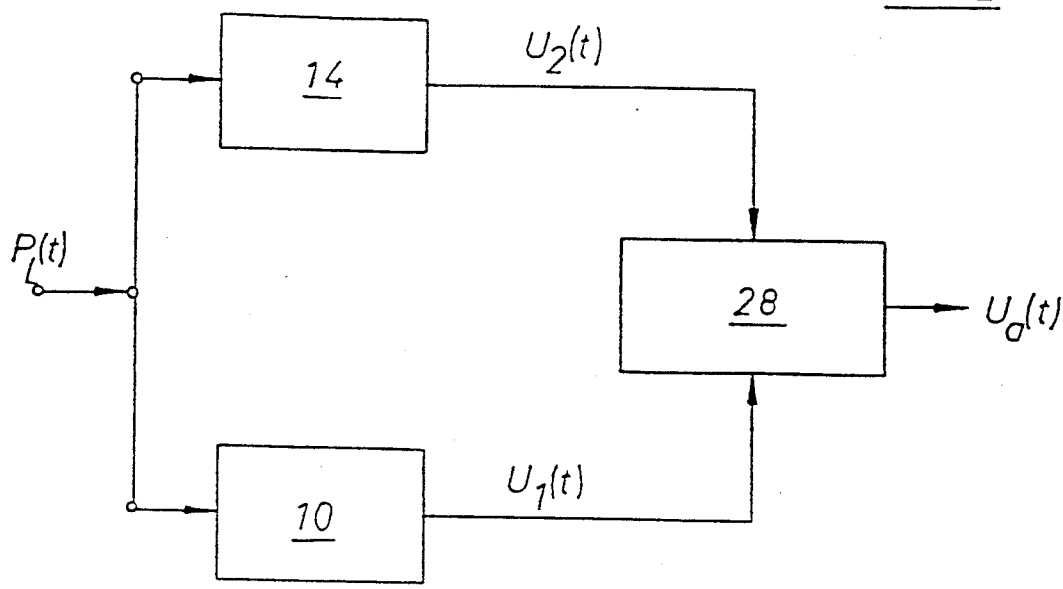
FIG. 2 A block circuit diagram of a circuit combining the measured signals of the detectors for producing an output signal corresponding to the radiation power.

According to FIG. 2 the detector 10 is a thermal detector, which in the case of a power change $P_L(t)$ of the power of the laser beam 12 emits a measurement signal 15 as the voltage $U_1(t)$. The thermal detector 10 is advantageously a thermopile, which comprises several, series-connected, miniaturized thermocouples and has a comparatively low thermal capacity of its active surface. Therefore the measurement signal 11 of the thermal detector 10 is relatively rapidly available and it is readily possible to detect power changes in the range 0 to 20 Hz. This corresponding band width b1 can be gathered from FIG. 3, where the voltage /U/ is plotted as a function of the frequency f. It is clear that power fluctuations, which occur more rapidly than with 100 Hz, can increasingly be no longer or no longer reliably detected by the thermal detector 10. This is achieved with the further detector 14, which is constructed as a pyroelectric detector and in the case of a power change $P_L(t)$ supplies a measurement signal 15 as $U_2(t)$ and, according to FIG. 3, this occurs in a range of a band width b2 of a few Hz to several 100 kHz.

Figure 3:
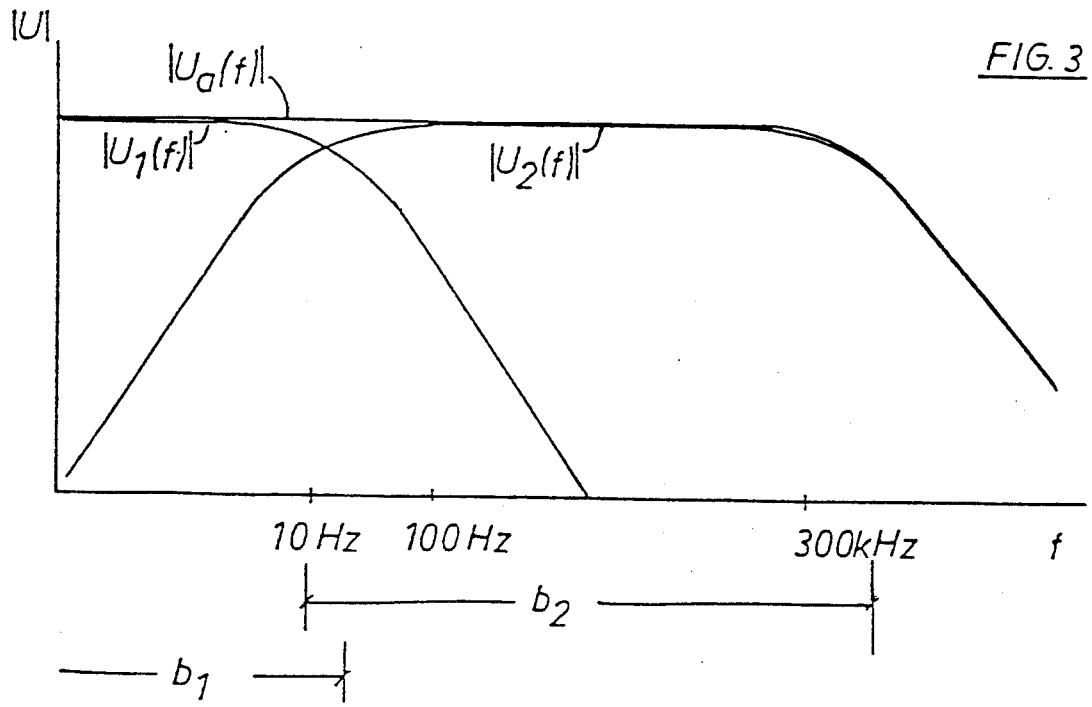
FIG. 3 The dependence of the output signal of the inventive circuit on the frequency.
Figure 4:
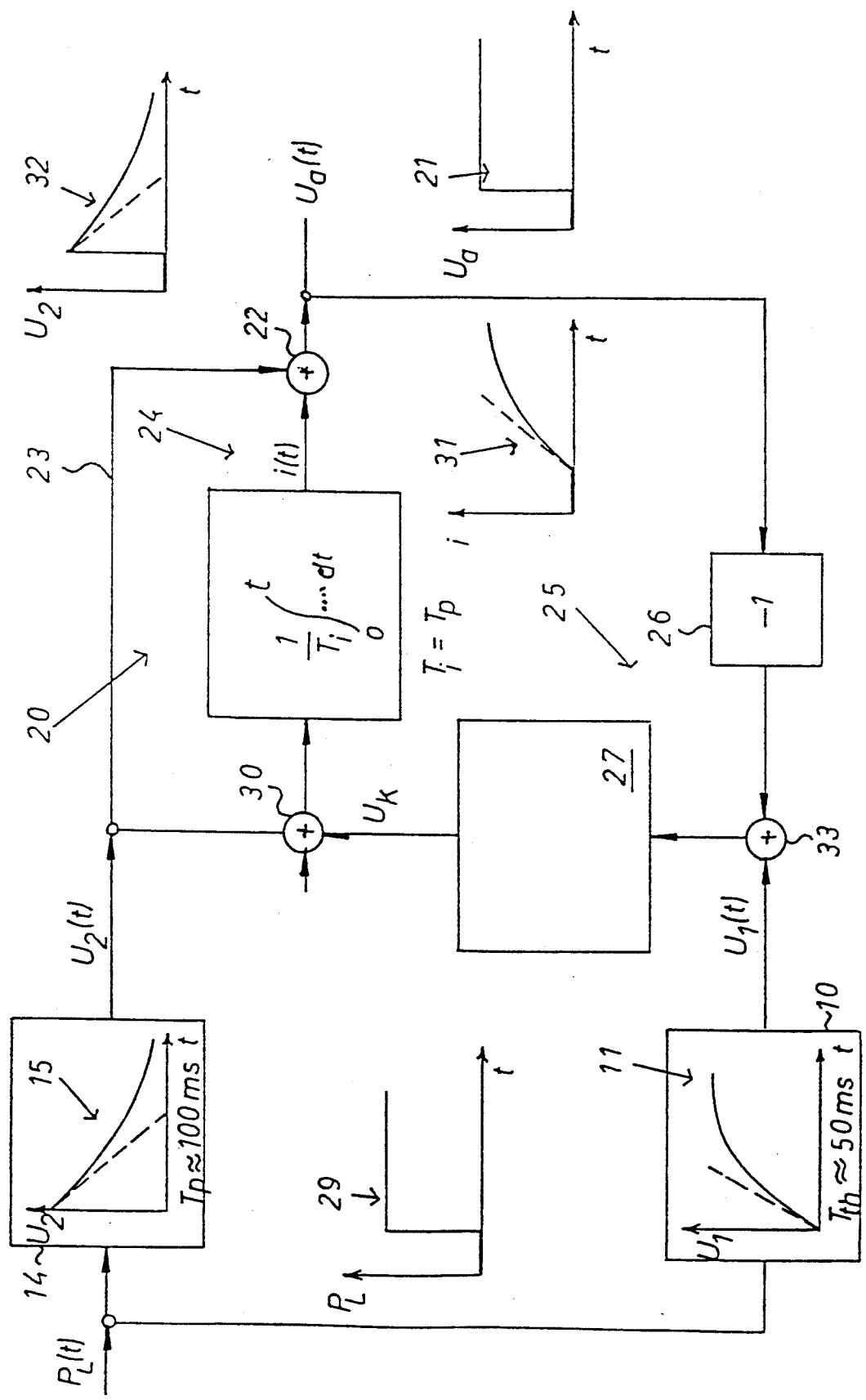
FIG. 4 A detailed view of the circuit of FIG. 2.

The pyroelectrically acting detector 14 essentially comprises a crystal, which can be very rapidly heated by the incident laser radiation in accordance with its power fluctuations and then influences corresponding electric changes at its contact faces, which are tapped and then produce the measurement signal 15, cf. FIG. 4. The tapping of the charges appropriately takes place by means of a current-voltage converter, whose input resistance is infinitely small in the ideal case. Therefore the discharge time of the crystal is also infinitely small, because this is determined by the time constant of the discharge circuit which, apart from the current-voltage converter resistance, is only influenced by the inherent capacitance of the pyroelectric detector. This is short-circuited by the current-voltage converter, so that the frequency response is not limited. The upper limit frequency of the detector 14 and therefore the entire measuring system is only limited by the wiring of the detector, which converts and amplifies the small current caused by the detector into the voltage $U_2(t)$. The lower limit frequency of $U_2(t)$ is determined by the thermal time constant of the pyroelectric detector 14. For the entire measuring system the course of the output signal $U_a$ according to FIG. 3 is $/U_a(f)/$. $U_a$ is consequently proportional to the beam power over a range of 0 to approximately 300 kHz. This band width can also be limited by a low-pass filter, in order to make available a signal for the digital power indication at the laser.

FIG. 4 explains the time response of the detectors 10, 14. For generating the output signal $U_a(t)$, it is assumed that the output levels of the detectors 10, 14 are matched to one another. If it is assumed that a laser power change in accordance with step 29 occurs on the detectors 10, 14, then the thermoelectric detector 10, which has a low-pass behaviour, produces a measurement signal 11 as a response to the step 29. Therefore the thermal detector distorts the signal $P_L(t)$ due to its thermal inertia. The corresponding step response of he pyroelectric detector 14 has the high-pass behaviour apparent from the measurement signal 15. The pyroelectric detector 14 distorts the signal $P_L(t)$ in the manner shown, because the polarization of the crystal is temperature change-dependent. If a constant power radiation strikes a pyroelectric crystal, then as a result a thermal equilibrium would occur, without further charge carriers being produced for a measurement signal at the contact faces of the crystal. Thus, the detector 14 does not provide a signal, which would be representative for the identical proportion of the radiation power. The distortion of the input signal $P_L(t)$ produced by said detector 14 must consequently also be taken into account by the combining circuit 28.

The comparison of the time dependence of the voltages $U_1(t)$ and $U_2(t)$ reveals that both would be supplemented by addition to the step shape of the input signal, if the time constants $T_p$ and $T_{th}$ were identical. Thus, in this case a simple addition would be sufficient in order to arrive at the time dependence of the output signal $U_a(t)$ shown at 21 and which corresponds to the time dependence of the input signal $P_L(t)$ at 29. As a rule, e.g.

in the manner indicated, suitable detectors 10, 14 have different time constants of their step responses. In this case it would be possible for the two detectors to be wired with timing elements matching aid time constants to one another. For example the thermal detector 10 can be wired with a filter supplying a slowed-down low-pass step response at its output. If the compensating time constants of the detectors 10, 14 were identical in such a case, it would also be sufficient to add the two signals $U_1(t)$ and $U_2(t)$, in order to produce a signal $U_a(t)$ corresponding to the time dependence of the input $P_L(t)$.

However, in practice the behaviour of the detectors 10, 14 does not correspond to the previously described ideal case, so that the equalizer 20 shown in FIG. 4 is necessary. The equalizer 20 essentially comprises a proportional branch 23 and an integrating circuit 24, which are connected to the inputs of an adder 22, which supplies the output signal $U_a(t)$. Thus across the proportional branch 23, $U_2(t)$ is directly supplied to the adder 22 and at the same time to a further adder 30, to whose other input a signal $U_k(t)$ is applied. This signal corresponds to a correction component for compensating any disturbance variables n(t) at the adder 30. The output of the adder 30 is connected to the integrating circuit 24, its time constant being $T_i=T_p$. On the basis of this condition, the integrating circuit 24 supplies a signal i(t) corresponding to the representation at 31. The comparison of the representations 32 regarding $U_2(t)$ and 31 regarding i(t) reveals that the adder 22 produces the desired proportional signal, so that the combination of proportional and integral branches 23, 24 forms the inverse transfer function of the pyroelectric detector, provided that the time constant $T_i$ of the integrating circuit 24 coincides with the thermal time constants $T_p$ of the detector 14.

If the behaviour of the pyroelectric detector 14 corresponded to the behaviour shown in the equivalent circuit diagram and the system was completely undisturbed, a correction circuit would no longer be necessary. Apart from the imprecisions during model formation, e.g. The thermal noise of the pyroelectric detector 14 is an unavoidable disturbance variable. Also in the case of the operational amplifiers used, e.g. 22, interference due to offset voltages as a result of thermal drift phenomena are unavoidable. They are integrated up by the integrating circuit 24 in the same way as the means value-free noise of the pyroelectric detector 14 is integrated up to an excessive mean value interference. Therefore the voltage $U_a(t)$ or the output voltage statistically drifts in ever larger amplitudes and would finally meet the limits given by the circuit supply voltage. In order to avoid these disadvantageous effects, a feedback circuit 25 is used in the combining circuit 28. In said circuit, the output signal $U_a(t)$ is subtracted via an inverting operational amplifier 26 from the voltage $U_1(t)$ via the adder 33, whose output is connected to a proportional-integral controller 27, which is inturn connected to an input of the adder 30, whilst generating the voltage $U_k(t)$. As a result of this feedback circuit 25 the output signal $U_a(t)$ is compared with the measurement signal $U_1(t)$ of the thermal detector 10 and in the case of a difference a negative correction value is produced with the aid of the PI-controller 27 and compensates the said disturbance variable n(t). By forcing the mean value of the measurement signal $U_1(t)$ on the output signal $U_a(t)$, there is an elimination of the imprecisions which would otherwise increase in magnitude with advancing time at the equalizer output. The dynamics during transient oscillation can also be improved by means of the proportional branch of the controller 27. In the said correction circuit use is made of the thermal detector 10 for eliminating the disturbance variable and makes available the desired value for the control circuit.

COMMERCIAL USABILITY

By measurement, the apparatus monitors both the time average and also the rapid power changes of infrared and carbon dioxide lasers.

We claim:

1. Apparatus for measuring the radiation power of a laser having a thermal detector, which supplies a measurement signal indicative of radiation power, comprising: a device which locally integrates the laser radiation and to which is connected at least one further detector, which is able to detect radiation power changes with a larger band width than the band width detectable by the thermal detector and a circuit combining the measurement signals of the detectors.

2. Apparatus according to claim 1, wherein the device for locally integrating the laser radiation has focusing optics for focusing the laser radiation into a small window of a hollow sphere having the detectors located therein in an area of the sphere interior which is only irradiated by the reflected radiation.

3. Apparatus according to one of the claims 1 or 2, wherein the thermal detector is a thermopile comprising numerous thermocouples and the further detector is a pyroelectric detector and, if necessary, a high or low-pass filter is provided.

4. Apparatus according to claim 3, wherein the thermal detector and the pyroelectric detector are constructed with the same time constants.

5. Apparatus according to claim 4, wherein the circuit combining the measurement signals of the detectors has an equalizer correcting different response behaviors of the detectors.

6. Apparatus according to claim 5, wherein the equalizer has an adder supplying an output signal, whereby to one input of the adder is connected a proportional branch supplying the measurement signal of the pyroelectric detector, and the other input is connected a circuit integrating the measurement signals of both detectors.

7. Apparatus according to claim 6, wherein the combining circuit is provided with a proportional-integral controller supplying its output signal and the measurement signal of the thermal detector to the input of the integrating circuit.

8. Apparatus according to claim 7, wherein the feedback circuit has an inverting operational amplifier and a proportional-integral controller supplying its output signal and the measurement signal of the thermal detector to the input of the integrating circuit of the equalizer.

9. Apparatus according to claim 1, wherein the device for locally integrating laser radiation is a diffusing screen.

10. Apparatus according to claim 3, wherein the thermal detector and the pyroelectric detector have timing elements which equalize the time constants of the detectors.

11. Apparatus according to claim 1, wherein the circuit combining the measurement signals of the detectors has an equalizer correcting different response behaviors of the detectors.

12. Apparatus according to claim 1, wherein the combining circuit is provided with a proportional-integral controller supplying its output signal and the measurement signal of the thermal detector to the input of the integrating circuit.

13. Apparatus for measuring the radiation power of a laser, comprising:
- a thermal detector, for providing an analog electrical signal indicative of radiation power;
- a second detector, for providing an analog electrical signal indicative of radiation power, wherein the frequency response of said second detector is different than the frequency response of said thermal detector;
- a device for locally integrating the laser radiation; and
- a circuit for combining the analog electrical signals to provide a single analog electrical signal indicative of laser radiation power.

14. Apparatus according to claim 13, wherein the device for locally integrating the laser radiation has focussing optics for focussing the laser radiation into a small window of a hollow sphere having the detectors located therein in an area of the sphere interior which is only irradiated by the reflected radiation.

15. Apparatus according to claim 14, wherein the thermal detector is a thermopile comprising numerous thermocouples and the second detector is a pyroelectric detector.

16. Apparatus according to claim 15, wherein the thermal detector and the pyroelectric detector are constructed with the same time constants.

17. Apparatus according to claim 16, wherein the circuit for combining the analog electrical signals of the detectors has an equalizer for correcting different response behaviours of the detectors.

18. Apparatus according to claim 17, wherein the equalizer has an adder supplying an output signal, whereby to one input of the adder is connected to a proportional branch supplying the measurement signal of the pyroelectric detector, and the other input is connected to an integrating circuit for integrating the measurement signals of both detectors.

19. Apparatus according to claim 18, wherein the circuit for combining the signals is provided with a proportional-integral controller supplying an output signal and the analog signal of the thermal detector to the input of the integrating circuit.

20. Apparatus according to claim 19, wherein the feedback circuit has an inverting operational amplifier and a proportional-integral controller supplying an output signal and the measurement signal of the thermal detector to the input of the integrating circuit of the equalizer.

* * * * *